United States Patent
Chadalapaka (10) Patent No.: US 8,959,171 B2
(45) Date of Patent: Feb. 17, 2015

(54) METHOD AND APPARATUS FOR ACKNOWLEDGING A REQUEST FOR DATA TRANSFER

(75) Inventor: Mallikarjun Chadalapaka, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2228 days.

(21) Appl. No.: 10/666,174

(22) Filed: Sep. 18, 2003

(65) Prior Publication Data

US 2005/0066046 A1  Mar. 24, 2005

(51) Int. Cl.
G06F 15/167 (2006.01)
H04L 29/08 (2006.01)

(52) U.S. Cl.
CPC ................................. H04L 69/32 (2013.01)
USPC .............. 709/212; 370/412; 709/250; 710/22

(58) Field of Classification Search
USPC ..................... 709/212, 250; 710/22; 370/412
See application file for complete search history.

(56) References Cited

U.S. PATENT DOCUMENTS

| | | | |
|---|---|---|---|
| 5,325,532 A | 6/1994 | Crosswy et al. |
| 5,675,807 A | 10/1997 | Iswandhi et al. |
| 5,737,604 A | 4/1998 | Miller et al. |
| 5,751,932 A | 5/1998 | Horst et al. |
| 5,809,285 A | 9/1998 | Hilland |
| 5,815,707 A | 9/1998 | Krause et al. |
| 5,822,571 A | 10/1998 | Goodrum et al. |
| 5,870,568 A | 2/1999 | Culley et al. |
| 5,872,941 A | 2/1999 | Goodrum et al. |
| 5,914,953 A | 6/1999 | Krause et al. |
| 5,948,111 A | 9/1999 | Taylor et al. |
| 5,964,835 A | 10/1999 | Fowler et al. |
| 5,978,858 A | 11/1999 | Bonola et al. |
| 5,983,269 A | 11/1999 | Mattson et al. |
| 6,018,620 A | 1/2000 | Culley et al. |

(Continued)

FOREIGN PATENT DOCUMENTS

EP  0757318 A2  2/1997

OTHER PUBLICATIONS

Ko, Mike; "Technical Overview of iSCSI extensions for RDMA (iSER) & Datamover Architecture for iSCSI (DA)," RDMA Consortium, Jul. 21, 2003; accessed <http://www.rdmaconsortium.org/home/iSER_DA_intro.pdf>, Whole Document.*

(Continued)

*Primary Examiner* — Thomas Dailey
(74) *Attorney, Agent, or Firm* — International IP Law Group, PLLC (57) ABSTRACT

The disclosed embodiments relate to an apparatus and method for acknowledging a data transfer. The first protocol may generate a request for a data transfer. The second protocol may receive the request for a data transfer from the first protocol. With the request, the second protocol may determine if the request for the data transfer contains a request for acknowledgement of completion of the data transfer. The second protocol may send a request corresponding to the request for data transfer to a third protocol. If the request for data transfer does contain a request for acknowledgement of completion of the data transfer, then the second protocol may set a variable in memory to wait for an event to correspond to the completion of the request and send an acknowledgement to the first protocol upon the occurrence of the event.

25 Claims, 4 Drawing Sheets

(56) References Cited

U.S. PATENT DOCUMENTS

| | | | |
|---|---|---|---|
| 6,038,621 A | | 3/2000 | Gale et al. |
| 6,047,323 A | | 4/2000 | Krause |
| 6,070,198 A | | 5/2000 | Krause et al. |
| 6,070,253 A | | 5/2000 | Tavallaei et al. |
| 6,157,967 A | | 12/2000 | Horst et al. |
| 6,163,834 A | | 12/2000 | Garcia et al. |
| 6,233,702 B1 | | 5/2001 | Horst et al. |
| 6,289,023 B1 | | 9/2001 | Dowling et al. |
| 6,484,208 B1 | | 11/2002 | Hilland |
| 6,493,343 B1 | | 12/2002 | Garcia et al. |
| 6,496,940 B1 | | 12/2002 | Horst et al. |
| 6,502,203 B2 | | 12/2002 | Barron et al. |
| 6,564,267 B1 | * | 5/2003 | Lindsay ............... 709/250 |
| 6,675,200 B1 | * | 1/2004 | Cheriton et al. ........ 709/212 |
| 7,177,921 B2 | * | 2/2007 | Taguchi ............... 709/220 |
| 2002/0199051 A1 | * | 12/2002 | Fukae et al. ............ 710/106 |
| 2004/0034725 A1 | * | 2/2004 | Elzur ................... 710/22 |
| 2004/0049603 A1 | * | 3/2004 | Boyd et al. ............. 710/1 |
| 2004/0062267 A1 | * | 4/2004 | Minami et al. .......... 370/463 |
| 2004/0085984 A1 | * | 5/2004 | Elzur ................... 370/412 |
| 2004/0156393 A1 | * | 8/2004 | Gupta et al. ............ 370/469 |

OTHER PUBLICATIONS

Wendt, Jim et al; "iSCSI-R Data Integrity" Oct. 4, 2002; Version 1d; accessed <http://www.haifa.il.ibm.com/satran/ips/iscsi-r-data-integrity-v1d.pdf>; slides 1-34.*

Satran, Julian et al; "iSCSI" Sep. 5, 2002; IPS Internet Draft, accessed <http://www.haifa.il.ibm.com/satran/ips/draft-ietf-ips-iscsi-16.pdf>, whole document.*

U.S. Appl. No. 10/400,313, filed Mar. 27, 2003, entitled Protection Domain Groups, Inventor: Jeffrey R. Hilland et al.

U.S. Appl. No. 10/401,234, filed Mar. 27, 2003, entitled Queue Pair/Window Association, Inventor: David J. Garcia et al.

U.S. Appl. No. 10/401,232, filed Mar. 27, 2003, entitled Physical Mode Addressing, Inventor: Kathryn Hampton et al.

U.S. Appl. No. 10/401,230, filed Mar. 27, 2003, entitled Physical Mode Windows, Inventor: David J. Garcia et al.

U.S. Appl. No. 10/401,237, filed Mar. 27, 2003, entitled Method and Apparatus for Performing Connection Management with Multiple Stacks, Inventor: Prashant Modi et al.

U.S. Appl. No. 10/401,233, filed Mar. 27, 2003, entitled Atomic Operations, Inventor: Dwight L. Barron et al.

U.S. Appl. No. 10/401,236, filed Mar. 27, 2003, entitled Signal Packet, Inventor: Dwight L. Barron.

U.S. Appl. No. 10/401,231, filed Mar. 27, 2003, entitled Shared Receive Queues, Inventor: Mallikarjun Chadalapaka et al.

U.S. Appl. No. 10/401,235, filed Mar. 27, 2003, entitled Binding a Memory Window to a Queue Pair, Inventor: David J. Garcia et al.

U.S. Appl. No. 10/641,127, filed Aug. 14, 2003, entitled Method and Apparatus for Accessing a Memory, Inventor: Mallikarjan Chadalapaka.

U.S. Appl. No. 10/641,129, filed Aug. 14, 2003, entitled Method and Apparatus for Implementing Work Request Lists, Inventors: Jeffrey R. Hilland et a l.

Jeffrey R. Hilland et al., "RDMA Protocol Verbs Specification (Version 1.0)" (Apr. 2003).

* cited by examiner

METHOD AND APPARATUS FOR ACKNOWLEDGING A REQUEST FOR DATA TRANSFER

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. The information may be transmitted by upper layer protocols ("ULPs"), which may be referred to as consumers, through a network that connects the computer systems together. These ULPs may utilize other protocols to perform the actual data exchanges between the computer systems. Typically, a ULP may not manage the transfer of data once the data exchange has been initiated. A consumer ULP may be utilized by an application protocol, such as the iSCSI protocol, so the iSCSI protocol may run on the network. The iSCSI protocol implementation may efficiently manage the data buffers, and may employ protocol mechanisms to realize the same.

To efficiently manage the buffers, the application protocol may proactively seek data acknowledgements from the application protocol on the other computer system. For instance, the target computer system may be sending data to an initiator computer system. The application protocol on the target computer system may seek data acknowledgements from the initiator computer system to confirm that data has been received. By verifying that the data is received at the initiator computer system, the application protocol on the target computer system may be aware that certain data will not be requested for retransmission. As a result, the application protocol on the target computer system may release the buffers for other uses.

However, the data acknowledgement process may pose certain problems. For instance, in some situations, the application protocol at the initiator computer system may not be involved in the data movement between the systems. When the initiator's application protocol is unaware of the actual data movement, it may be unable to confirm to the application protocol of the target of the data transfer. In addition, if the application protocol of the target sends an acknowledgement request, an interrupt may be generated to the application protocol on the initiator computer system to handle the request. In such a case, the number of interrupts that the initiator computer system may have to handle is unlimited, which may violate traditional expectations on storage hardware not to require more than a single interrupt per input/output transaction.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve the ability of systems to remotely access the memory of other systems. One such specification under development is the RDMA Consortium Protocols Verb specification, which is hereby incorporated by reference. The verbs defined by this specification may correspond to commands or actions that may form a command interface for data transfers between memories in systems.

RDMA may refer to the ability of one system to directly place information in the memory space of another system, while minimizing demands on the central processing unit ("CPU") and memory bus. The systems may be computer systems, storage controllers, appliances, routers, layer 4 switches, I/O modules, or the like. In an RDMA system, an RDMA layer or protocol may interoperate over any physical or wireless layer in a Local Area Network ("LAN"), Server Area Network ("SAN"), Metropolitan Area Network ("MAN"), or Wide Area Network ("WAN"), backplane, or bus.

Figure 1:
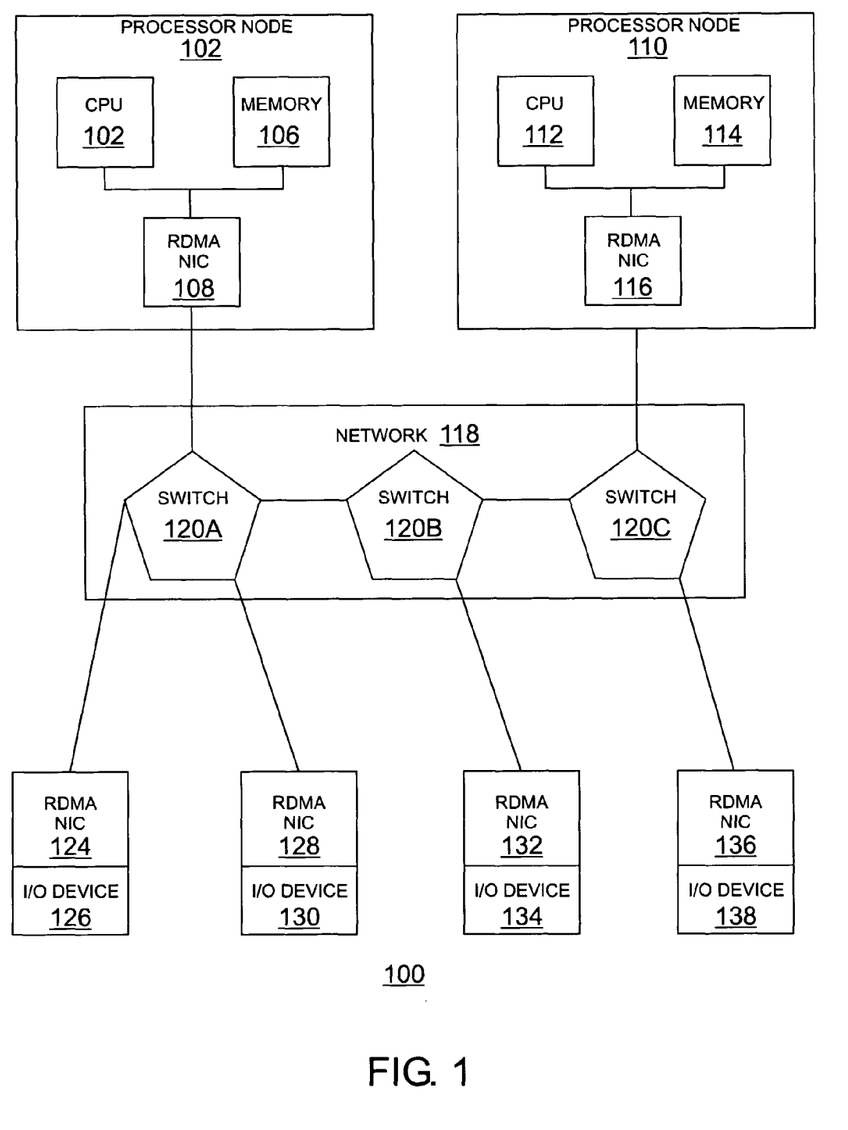
FIG. 1 is a block diagram illustrating a computer network in which embodiments of the present invention may be employed.

Referring now to FIG. 1, a block diagram illustrating a network in accordance with embodiments of the present invention is illustrated. The network is indicated by the reference numeral 100 and may comprise a first processor node 102 and a second processor node 110, which may be connected to a plurality of input/output ("I/O") devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. Also, the CPU 104 may be a processing element, state machine, or the like. The CPU 104 may be connected to the memory 106 and the RNIC 108 over an internal bus or connection. The memory 106 may be utilized to store information for use by the CPU 104, the RNIC 108 or other systems or devices. The memory 106, which may be integrated into the CPU 104, may include memory controllers and various types of memory, such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers, point to point links, and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. The I/O devices may be any variant from a traditional I/O device to a bridge, route or other translation device or even loopback. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using protocol stacks. The exchange of data or information using protocol stacks is explained with reference to FIG. 2.

Figure 2:
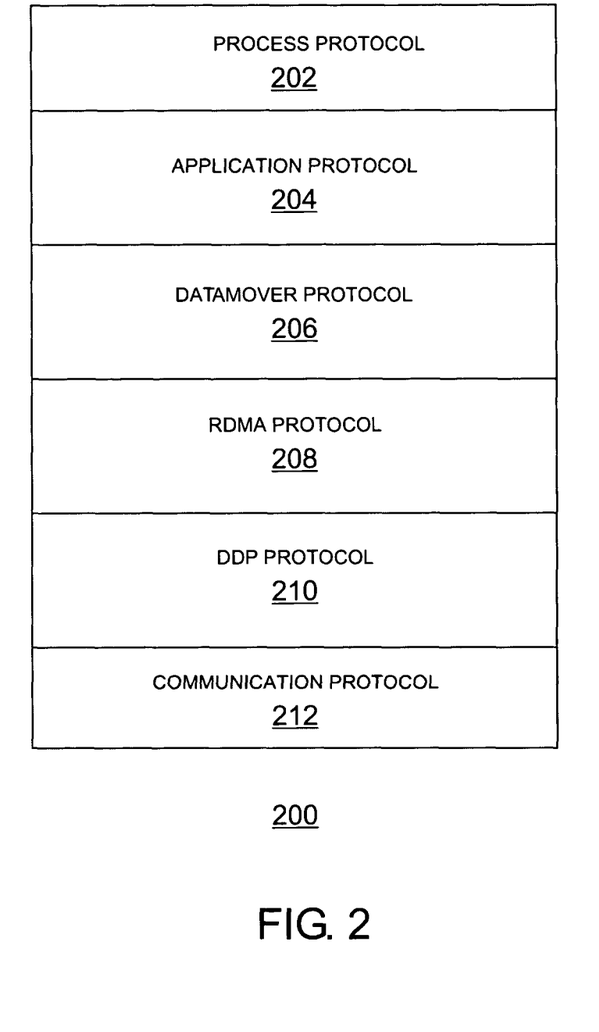
FIG. 2 is a block diagram illustrating an upper layer protocol with a protocol stack in accordance with one embodiment of the present invention.

FIG. 2 is a block diagram illustrating an upper layer protocol with a protocol stack in accordance with an embodiment of the present invention. The RNICs 108, 116, 124, 128, 132 and 136 (FIG. 1) may be adapted to exchange information using the protocol stack 200.

FIG. 2, a process protocol 202, which may comprise a process or application, may interact with the protocol stack to communicate with other devices or within the node. The process protocol 202 may interact with a process protocol in another system to exchange data. For instance, the process protocol 202 may comprise a small computer systems interface ("SCSI") protocol that is an intelligent peripheral I/O interface protocol, which allows many different peripheral devices to communicate with other components of the system. The process protocol 202 may interact with an application protocol 204, which may be an Internet SCSI ("iSCSI") protocol.

The application protocol 204 may interact with a protocol or a group of protocols that are referred to as the datamover protocol layer or datamover protocol 206, which may be a consumer, upper layer protocol such as an instance of the iSCSI Extensions for RDMA ("iSER") protocol. The datamover protocol 206 may offload the tasks of data movement and placement from the application protocol 204. To facilitate data transfers over networks or manage data storage, the datamover protocol 206 may define a data acknowledgement model that is used to efficiently manage buffers in servicing the application protocol 204. The datamover protocol 206 may communicate with a suite of wire protocols that may include an RDMA protocol 208, a direct data placement ("DDP") protocol 210, or a marker with protocol data unit alignment ("MPA") protocol (not shown). These wire protocols may be referred to as the iWARP protocols. By utilizing the iWARP protocols, the datamover protocol 206 may utilize the RDMA semantics to achieve a true zero copy of data behavior through the use of RNICs between systems. A true zero copy of data behavior is a mechanism for a data exchange with packets being sufficiently self described that RNICs may place the data directly in the specified receive location. As a result, with true zero copy behavior, data copies may not be used in the data exchange. The RDMA protocol 208 interacts with the datamover protocol 206 to exchange data without interrupting the system processor on the initiator system. The RDMA protocol 208 communicates with the DDP protocol 210 to translate messages from the RDMA protocol 208 for transmission across a network, such as switch network 118 (FIG. 1).

The iWARP protocols may interact with communication protocols 212 to communicate on a network. The communication protocols 212 may include the transmission control protocol/internet protocol ("TCP/IP"), user datagram protocol ("UDP"), or the like. In addition to the IP protocol, routing information may be provided by a routing protocol such as AppleTalk, DEC Net, or other similar routable protocols. The communication protocols 212 may vary depending on the specific network being used to communicate between systems. The operation of the protocol stack 200 is further explained with respect to FIG. 3.

Figure 3:
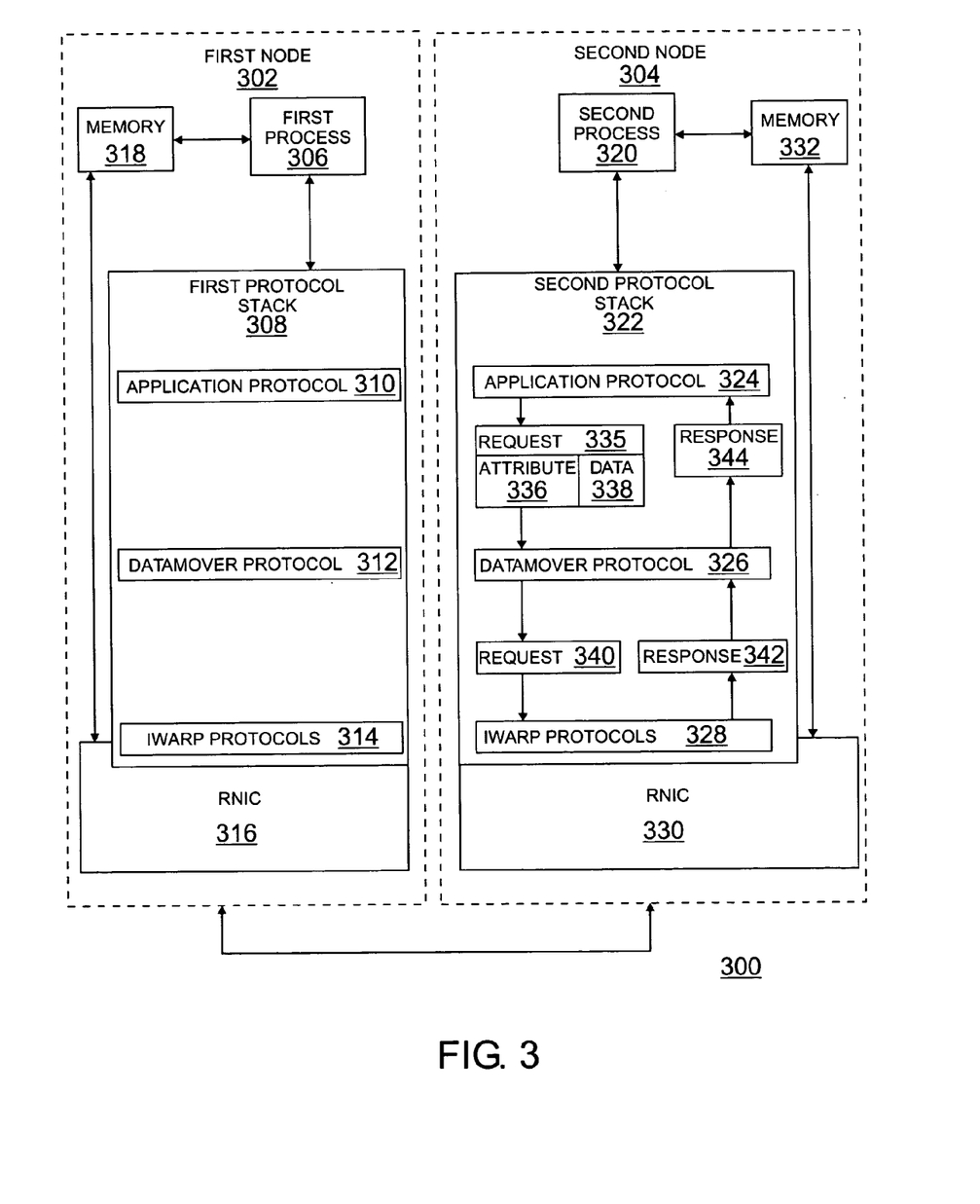
FIG. 3 is a block diagram that illustrates the use of a protocol stack to exchange data between nodes in accordance with one embodiment of the present invention.

FIG. 3 is a block diagram that illustrates the use of a protocol stack, such as protocol stack 200, to exchange data between devices in accordance with embodiments of the present invention. The figure is generally referred to by the reference numeral 300. In FIG. 3, a first node 302 and a second node 304 may exchange information through protocol stacks, such as the first protocol stack 308 and a second protocol stack 322. The first node 302 and second node 304 may correspond to any two of the first processor node 102, the second processor node 110, or the I/O devices 126, 130, 134 and 138 (FIG. 1). As set forth above with respect to FIG. 1, any of the nodes 302 and 304 may exchange information in an RDMA environment.

The first node 302 includes a first process 306, such as the process protocol 202 (FIG. 2), which interacts with an RNIC 316 and a memory 318. The first process 306 may comprise software, firmware, a silicon process or the like that may interact with various components of the RNIC 316 through a first protocol stack 308, which may correspond to the protocol stack 200 (FIG. 2). The first protocol stack 308 may include an application protocol 310, which may comprise the application protocol 204 (FIG. 2), a datamover protocol 310, which may comprise the datamover protocol 206 (FIG. 2), and an iWARP protocol suite 314, which may include the RDMA protocol 208 and the DDP protocol 210 (FIG. 2). The first protocol stack 308 may communicate with the RNIC 316, which may correspond to one of the RNICs 108, 116, 124, 128, 132 or 136 (FIG. 1), depending on which of the devices associated with those RNICs is participating in the data transfer. The RNIC 316 may comprise various other buffers and components, such as a send queue, a receive queue, a completion queue, a memory translation and protection table, a memory, and a QP context, which are not shown.

The second node 304 includes a second process 320, such as the process protocol 202 (FIG. 2), which interacts with an RNIC 330 and a memory 332. The second process 320 may comprise software, firmware, a silicon process or the like that may interact with various components of the RNIC 330 through a second protocol stack 322, which may correspond to the protocol stack 200 (FIG. 2). The second protocol stack 322 may include an application protocol 324, which may comprise the application protocol 204 (FIG. 2), a datamover protocol 326, which may comprise the datamover protocol 206 (FIG. 2), and an iWARP protocol suite 328, which may include the RDMA protocol 208 and the DDP protocol 210 (FIG. 2). The second protocol stack 322 may communicate with the RNIC 330, which may correspond to one of the RNICs 108, 116, 124, 128, 132 or 136 (FIG. 1), depending on which of the devices associated with those RNICs is participating in the data transfer. The RNIC 330 may comprise various other buffers and components, such as a send queue, a receive queue, a completion queue, a memory translation and protection table, a memory, and a QP context, which are not shown.

The portions of the memories 318 and 332 may be registered to different processes, each of which may correspond to the processes 306 and 320. The memories 318 and 332 may comprise a portion of the main memory of the nodes 302 and 304, memory within the RNICs 316 and 330, or other memory associated with the nodes 302 and 304. The application protocols 310 and 324 may be used to efficiently manage the buffers associated with the processes 306 and 320. Those skilled in the art will appreciate that buffers (not shown) may be associated with processes 306 and 320 for storage of data, which may be a portion of the memories 318 or 322. The datamover protocols 312 and 326 and iWARP protocols 314 and 328 may exchange data between the nodes 302 and 304, as indicated by the arrows that indicate the data flow between the RNICs 316 and 330.

To initiate a data exchange between the RNICs 316 and 330 and the associated protocols, the application protocol may communicate with each other to establish rules of operation. The application protocol may use default rules or may negotiate the rules that may include error recovery levels for the data exchange or RDMA Write/Read ordering rules of the RDMA protocol. Likewise, the protocols 310, 312, 314, 324, 326, and 328 may exchange commands or requests between the protocol stacks 308 and 322 and the processes 306 and 320, within the protocol stack 308 or 322, or between the RNICs 316 and 330.

Within the node 302 or 304, the process protocol such as the SCSI protocol may utilize the protocol stacks to effect a data transfer. For instance, the application protocol 310 or 324 may efficiently manage the buffers within the memory 318 or 332 for the process 306 or 320. However, in RDMA, the datamover protocols 312 and 326 and the iWARP protocols 314 and 328 may be involved in the movement of data between the nodes 302 and 304. As a result, the application protocol 310 or 324 may have to rely on responses, such as acknowledgements, notifications or interrupts, from the datamover protocol 312 and 326 to determine if the data exchange has been completed. The application protocol 310 or 324 may depend on these responses because it is not involved in the actual data movement. In this context, the application protocol 310 or 324 is unable to determine the amount of data that has been exchanged between the nodes 302 and 304.

Under this approach, the initiator application protocol 310 or 324 (the node 302 or 304 that initiates a request for data) cannot acknowledge the amount of data transferred because the initiator application protocol 310 or 324 (the node sending the data) is not involved in the data movement. For instance, if the process protocol 306 in node 302 requests a large amount of data from the process protocol 320 in node 304, then the initiator application protocol 310 cannot acknowledge the amount of data transferred to the first node 302 because the initiator application protocol 310 was not involved in the data movement. Without an acknowledgement, the second application protocol 324 may have to maintain data within the buffers to retransmit data if requested.

Also, under this approach, the initiator application protocol 310 may be interrupted multiple times to respond to acknowledgement requests from the target application protocol 324, which may violate an expectation that permits a single interrupt per I/O transaction.

To efficiently manage the buffers within the memory 318 or 332, the application protocol 310 or 324 may send a request to the datamover protocol 312 or 326 to request an acknowledgement of the data exchanged between the nodes 302 and 304. The use of the acknowledgement mechanism described in the following paragraphs provides the benefits of minimizing the exchanges between protocols and decreases the potential number of interrupts used in exchanging data between processes. In addition, the acknowledgement mechanism also decreases the time that the buffers in the memory 318 and 332 have to be maintained for a data exchange. As such, the acknowledgement mechanism may allow the system to enhance performance by providing improved flexibility and control over the buffers in data exchanges. These benefits are explained below with regard to the interaction between protocols and the processes.

The acknowledgement mechanism may be implemented in the datamover protocol 312 or 326. As an exemplary embodiment, assume the application protocol 310 is the initiator of a data exchange, while the application protocol 324 is the target. During an establishment phase, the application protocols 310 and 324 may determine the rules of operation, which may include establishing the error recovery levels for the data exchange or other similar rules. For instance, the application protocols 310 and 324 may set the data error recovery level to a value of "0," which may be referred to as ERL0. If the ERL0 is set, the application protocols 310 and 324 will not rely on any data acknowledgements. Yet, if the application protocols 310 and 324 set the data error recovery level to a value of "1," which may be referred to as ERL1, then the application protocols 310 and 324 will rely on local RDMA write completion events to notify the other node 306 or 320 of a completion event. The local RDMA write completion events may indicate that the buffer ownership is back to the application protocol 312 or 326. Similarly, the error recovery level may be set to "2," which may be referenced as ERL2. The ERL2 may utilize a zero length RDMA read request to indicate that the preceding RDMA writes are complete. The zero length RDMA read completion may indicate an end to end data acknowledgement from the initiator node. The event may be an action that results from the iWARP protocol 314 or 328. The application protocol may notify the value of currently operational error recovery level to the datamover protocol in a manner not described here.

With the rules for operation being defined, the various protocols in the second protocol stack 322 may exchange information and requests during the data exchange as shown within the second protocol stack 322. For instance, the application protocol 324 may send a request 335 to the datamover protocol 326 to indicate that it wants an acknowledgement notification for the data exchange. The request 335 may include an attribute 336 along with data 338. The attribute 336 may be an "A-bit" setting or a specific value in a predetermined field of the request 335 that indicates a request for data acknowledgement.

Once the request is received by the datamover protocol 326, it may determine how to handle the acknowledgements for the application protocol 324. The datamover protocol 326 may examine the attribute 336 within the request 335. If the attribute 336 indicates an acknowledgement request, then the datamover protocol 326 may utilize the attribute 336 with the use of the rules established to determine the appropriate acknowledgement mechanism to be used with the error recovery level. If ERL1 is operational, then the datamover protocol 326 may send an request 340, which may be an RDMA write message, to the iWARP protocol 328. If ERL2 is operational, then the datamover protocol 326 may send multiple requests, which may be indicated by 340, to the iWARP protocols 328. The multiple requests may include an RDMA write message and a zero length RDMA read message. Accordingly, the requests and responses may be exchanged between the RNIC 330 and the RNIC 316.

Once the RNIC 330 processes the reply from the RNIC 316 or the RNIC 330 completes the write data transfer, the iWARP protocols 328 may issue a response 342 to the datamover protocol 326. The response 342 may be an RDMA read completion and/or an RDMA write completion. Once the response 342 is received and the datamover protocol 326 determines that it is associated with an outstanding acknowledgement request, the datamover protocol 326 may issue a response 344 that is a data acknowledgement from the datamover protocol 326 to the application protocol 324. The application protocol 324 may notify the second process 320 to release buffers in the memory 332 because the data acknowledgement indicates that the data has been received and that the data will not be requested for retransmission. The operation of the datamover protocol 312 or 326 is shown in greater detail in FIG. 4.

Figure 4:
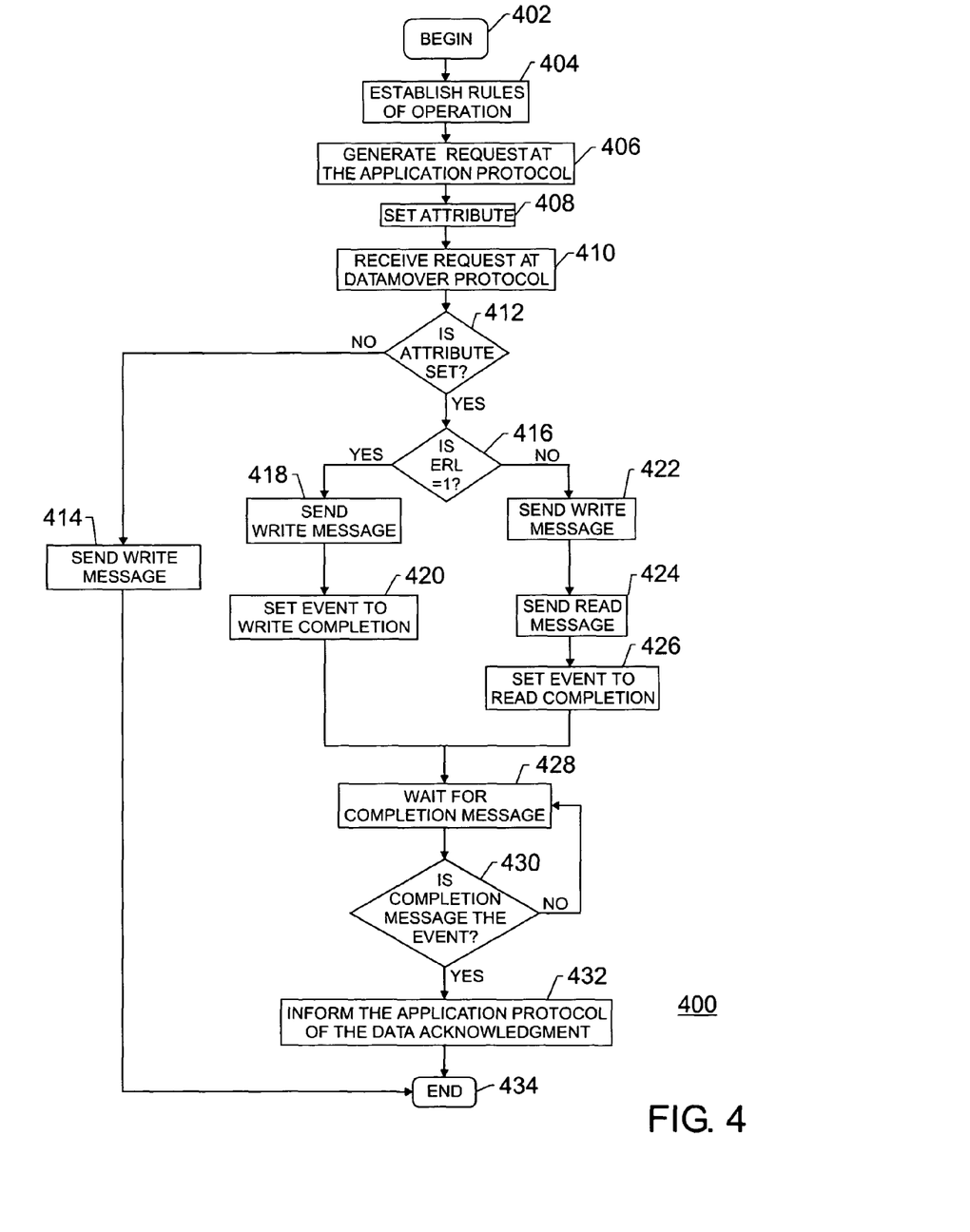
FIG. 4 is a process flow diagram showing a process in accordance with one embodiment of the present invention.

FIG. 4 is a process flow diagram in accordance with an embodiment of the present invention. In the diagram, generally referred to by reference numeral 400, the acknowledgement mechanism, such as the one used by the datamover protocol 312 or 326 (FIG. 3), may be utilized to notify the application protocol 310 or 324 (FIG. 3) that a data exchange has completed. The process begins at block 402. At block 404, the application protocols 310 and 324, which may be an iSCSI protocol, for example, may establish the rules of operation for the data transfers between the nodes 302 and 304 (FIG. 3). The establishment of rules may be at the time the initiator and target nodes establish a connection. The application protocol may generate a request, as shown in block 406. The application protocol may then set an attribute, such as the attribute 336 (FIG. 3), as shown in block 408. The attribute may indicate that data acknowledgement response is requested by the application layer protocol, such as the application protocol 310 or 324. Once the attribute is set, the request may be a request for a data transfer along with an acknowledgement request, such as the request 335 (FIG. 3).

The datamover protocol may receive the request with the attribute at block 410. At block 412, the datamover protocol may determine whether the attribute is set. If the attribute is not set, then the datamover protocol may send a write message to the RDMA protocol, which may be part of the iWARP protocol 314 or 328 (FIG. 3), as shown in block 414. The write message may be an RDMA write message. However, if the attribute is set, then the datamover protocol may determine the error recovery level in block 416. The error recovery level may indicate an ERL1 or an ERL2, as discussed previously with regard to FIG. 3.

If the error recovery level is ERL1, then the datamover protocol may send a write message, as shown in block 418. The write message may be an RDMA write message that may include data in a protocol data unit ("PDU") along with a label or an identifier that is associated with the write message. The PDU may be a packet of data units that includes data and control information that is exchanged between two nodes by a protocol. The datamover protocol may then set a variable in memory, as shown in block 420, to indicate that the write message completion event is expected to generate the data acknowledgement confirmation. The setting of the event may be stored into a memory location and indicate a label or other identifier that is associated with the write message.

However, if the error recovery level is not ERL1, then the datamover protocol may send a write message, as shown in block 422. The write message may be an RDMA write message that may include data in the protocol data unit ("PDU") along with an identifier that is associated with the write message. The datamover protocol may then send a read message, as shown in block 424. The read message may be a zero length RDMA read message. The datamover protocol may then set a variable in memory as shown in block 426 to indicate that the read message completion event is expected to generate the data acknowledgement confirmation. The setting of the event may be stored into a memory location and indicate a label or other identifier that is associated with the read message.

After either block 420 or 426, the datamover protocol may wait for a response or completion message, as shown at block 428. Once a completion message is received, the datamover protocol may examine the completion message to determine if the completion message refers to the event, as shown in block 430. The event may be a completion of the read or write message with the associated identifier. If the completion message does not refer to the event, then the datamover protocol may wait for another completion message at block 428. However, if the completion message refers to the event, then the datamover protocol may notify the application layer of the data acknowledgement confirmation at block 432. Accordingly, the process ends at block 434.

Beneficially, the datamover protocols use of write and/or read messages may provide a data acknowledgement mechanism that is able to enhance the systems performance. With regard to the read messages, the datamover protocol is able to minimize the number of interrupts by using the write and read messages to communicate between the RNICs. In RDMA, the zero length RDMA read message may be received by the initiator RNIC. The initiator RNIC may respond to zero length RDMA read message without generating an interrupt to the initiator application protocol within the initiator. Also, under the read/write ordering rules of the RDMA protocol, the zero length RDMA read message may not pass the RDMA write message, and thus the RDMA read message acts to flush the connection of preceding RDMA write messages. As a result, the datamover protocol may generate a notification, such as a data acknowledgement confirmation, to the local application protocol without generating an interrupt at the other node. Accordingly, the operation of the system is enhanced by the datamover's use of the read messages in RDMA.

In addition, the datamover protocol's use of write messages may provide a data acknowledgement mechanism that also enhances the system's performance by simplifying the datamover protocol to RNIC interactions. As discussed above, the write messages may be used when the error recovery level is "1." With an ERL1, the connection recovery feature of the application protocol may not be implemented. As a result, if the connection fails, then the data associated with the data exchange on the failed connection may not be requested on a new connection. With a write message, once the write completion is delivered to the datamover protocol, the RNIC will transfer the data if the connection stays up. As such, the datamover protocol may act as if the data acknowledgement has been received from the initiator when a write completion is received. Accordingly, the operation of the system is enhanced by the datamover's use of the write messages in RDMA.

While the invention may be susceptible to various modifications and alternative forms, specific embodiments have been shown by way of example in the drawings and are described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus for acknowledging a data transfer, comprising:
   a processor configured to transfer data according to a plurality of protocols of a protocol stack, the protocol stack comprising:
   a first protocol layer to initiate a request for a data transfer; and
   a second protocol layer to:
      receive the request for the data transfer from the first protocol layer;
      determine whether the request for the data transfer contains a request from the first protocol layer for acknowledgement by the second protocol layer of completion of the data transfer;
      send a performance request for completion of the data transfer to a third protocol layer; and
      in response to a determination that the request for the data transfer does contain the request from the first protocol layer for acknowledgement by the second protocol layer of the completion of the data transfer:
         set a variable in memory to wait for an event corresponding to the completion of the request for data transfer; and
         generate and send an acknowledgement to the first protocol layer upon the occurrence of the event.

2. The apparatus set forth in claim 1, wherein the first protocol layer is an internet small computer systems interface ("iSCSI") protocol layer.

3. The apparatus set forth in claim 1, wherein the second protocol layer is an internet small computer systems interface extensions for remote direct memory access ("iSER") protocol layer.

4. The apparatus set forth in claim 1, wherein a value of an error recovery level is notified to the second protocol layer from the first protocol layer.

5. The apparatus set forth in claim 4, wherein the event is a write completion when the error recovery level has a first value, and wherein the event is a read completion when the error recovery level has a second value.

6. The apparatus set forth in claim 1, wherein the third protocol layer is a remote direct memory access ("RDMA") protocol layer.

7. The apparatus set forth in claim 1, wherein the event corresponding to the completion of the request for data transfer is a zero length remote direct memory access ("RDMA") read completion.

8. A network arrangement, comprising:
   a plurality of systems, at least one of the plurality of systems comprising a protocol stack and a process;
   at least one input/output device;
   a network that connects the plurality of systems and the at least one input/output device for communication; and
   wherein the protocol stack comprises:
      a first protocol layer to interact with a consumer;
      a second protocol layer to:
         receive a data exchange request from the first protocol layer, wherein the data exchange request is a request to initiate a data transfer;
         determine whether the data exchange request contains an acknowledgement request from the first protocol layer for acknowledgement by the second protocol layer of completion of the data transfer;
         send a performance request for completion of the data exchange request to a third protocol layer; and
         in response to a determination that the data exchange request contains the acknowledgement request:
            set a variable in memory to wait for an event that corresponds to a completion of the performance request; and
            generate and send an acknowledgement to the first protocol layer upon the occurrence of the event.

9. The network arrangement set forth in claim 8, wherein the third protocol layer interacts with the second protocol layer and the third protocol layer is to:
   receive the performance request for completion of the data exchange request; and
   transmit a message to at least one of the plurality of systems and the at least one input/output device via the network.

10. The network arrangement set forth in claim 9, comprising a remote direct memory access network interface card ("RNIC") that is used by the protocol stack to exchange the message between the at least one of the plurality of systems and the at least one input/output device via the network.

11. The network arrangement set forth in claim 9, wherein the message is a remote direct memory access ("RDMA") write message.

12. The network arrangement set forth in claim 8, wherein the first protocol layer is further to set an error recovery level, wherein the event is a write completion when the error recovery level has a first value, and wherein the event is a read completion when the error recovery level has a second value.

13. The network arrangement set forth in claim 8, wherein the second protocol layer is an internet small computer systems interface extensions for remote direct memory access ("iSER") protocol.

14. The network arrangement set forth in claim 12, wherein the second protocol layer is further to send a zero length remote direct memory access ("RDMA") read message to the third protocol layer when the error recovery level has the second value.

15. The network arrangement set forth in claim 8, wherein the process operates according to a small computer systems interface protocol ("SCSI").

16. A method of acknowledging a data transfer, the method comprising:
   transferring, by a processor, data according to a plurality of protocols;
   receiving, from a first protocol layer by a second protocol layer, a request for initiating a data transfer;

determining, by the second protocol layer, whether the request for initiating the data transfer contains a request from the first protocol layer for acknowledgement by the second protocol layer of completion of the data transfer;

sending, by the second protocol layer, a performance request corresponding to the request for initiating the data transfer to a third protocol layer, wherein the first, second, and third protocol layers are included in a protocol stack; and in response to a determination that the request for initiating the data transfer does contain the request from the first protocol layer for acknowledgement by the second protocol layer of completion of the data transfer:

setting, by the second protocol layer, a variable in memory to wait for an event corresponding to the completion of the data transfer, and generating and sending, by the second protocol layer, an acknowledgement to the first protocol layer upon the occurrence of the event.

17. The method set forth in claim 16, comprising defining the first protocol layer as an internet small computer systems interface ("iSCSI") protocol layer.

18. The method set forth in claim 16, comprising defining the second protocol layer as an internet small computer systems interface extensions for a remote direct memory access ("iSER") protocol layer.

19. The method set forth in claim 16, comprising establishing an error recovery level by the first protocol layer to indicate the error recovery level in the request for acknowledgement of completion of the data transfer.

20. The method set forth in claim 19, comprising defining the event as a remote direct memory access ("RDMA") write message completion when the error recovery level has a first value, and defining the event as an RDMA read completion when the error recovery level has a second value.

21. The method set forth in claim 20, comprising sending, by the second protocol layer, a zero length remote direct memory access ("RDMA") read message to the third protocol layer when the error recovery level has the second value.

22. An apparatus for acknowledging a data transfer, comprising:

a processor;

means executable on the processor for receiving, from first protocol layer by a second protocol layer, a request for initiating a data transfer;

means executable on the processor for determining, by the second protocol layer, whether the request for initiating the data transfer contains a request from the first protocol layer for acknowledgement by the second protocol layer of completion of the data transfer;

means executable on the processor for sending, from the second protocol layer, a performance request corresponding to the request for initiating data transfer to a third protocol layer, wherein the first, second, and third protocol layers are included in a protocol stack; and means executable on the processor for, in response to a determination that the request for initiating the data transfer does contain the request from the first protocol layer for acknowledgement by the second protocol layer of completion of the data transfer:

setting, by the second protocol layer, a variable in memory to wait for an event to correspond to the completion of the performance request, and generating and sending, by the second protocol layer, an acknowledgement to the first protocol layer upon the occurrence of the event.

23. A computer storage medium storing a program, the program executable on a processor node and comprising:

first protocol code for performing a first protocol stored on the computer storage medium for generating a request for initiating a data transfer; and second protocol code for performing a second protocol stored on the computer storage medium for:

receiving the request for initiating the data transfer from the first protocol code;

determining whether the request for initiating the data transfer contains a request from the first protocol code for acknowledgement by the second protocol code of completion of the data transfer;

sending a performance request for completion of the data transfer to a third protocol code; and in response to a determination that the request for initiating the data transfer contains the request from the first protocol code for acknowledgement by the second protocol code of completion of the data transfer:

setting a variable in memory to wait for an event corresponding to the completion of the performance request; and generating and sending an acknowledgement to the first protocol code upon the occurrence of the event.

24. The apparatus as set forth in claim 1, wherein the processor and first, second, and third protocol layers are part of an initiator node to perform the data transfer with a target node.

25. The method as set forth in claim 16, wherein the processor and first, second, and third protocol layers are part of an initiator node to perform the data transfer with a target node.

* * * * *

UNITED STATES PATENT AND TRADEMARK OFFICE
CERTIFICATE OF CORRECTION

PATENT NO. : 8,959,171 B2  
APPLICATION NO. : 10/666174  
DATED : February 17, 2015  
INVENTOR(S) : Mallikarjun Chadalapaka et al.

Page 1 of 1

It is certified that error appears in the above-identified patent and that said Letters Patent is hereby corrected as shown below:

In the Claims

In column 11, line 43, in Claim 22, delete "from" and insert -- from a --, therefor.

Signed and Sealed this
Seventh Day of July, 2015

Michelle K. Lee
*Director of the United States Patent and Trademark Office*